April 18, 1933.  H. EWING ET AL  1,904,678
DYNAMOMETER
Filed July 30, 1929
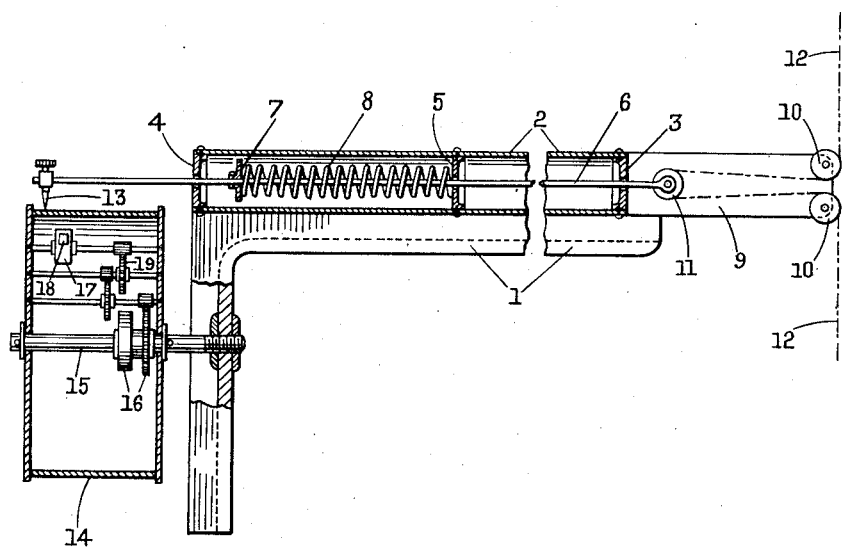
HENRY EWING
ROBERT P. ROBERTS
Inventors Patented Apr. 18, 1933

1,904,678

UNITED STATES PATENT OFFICE

HENRY EWING AND ROBERT PIERCE ROBERTS, OF SPONDON, NEAR DERBY, ENGLAND, ASSIGNORS TO CELANESE CORPORATION OF AMERICA, A CORPORATION OF DELAWARE

DYNAMOMETER

Application filed July 30, 1929, Serial No. 382,115, and in Great Britain August 11, 1928.

This invention relates to dynamometers and more particularly to dynamometers for testing the tension in running yarns, threads, filaments, or the like.

The object of the invention is to provide a dynamometer capable of being readily applied wherever desired to running yarns, threads, filaments, or the like so as to obtain a record of the tension thereof. It is a further object of the invention to provide a dynamometer which is extremely sensitive to variations in the tension and enables an accurate record of such variations to be obtained.

It is often desirable in textile operations to ascertain the tension in running yarns, threads, filaments, or the like, but, owing to the large and rapidly occurring fluctuations in the tension, instruments which merely indicate the tension on a scale or dial are very unsatisfactory in that the oscillations of the pointer are such that only an approximation of the tension can be read. Further, it is impossible by their use to obtain anything but the barest approximation of the average tension over a period of time. The dynamometer according to the invention is arranged to overcome all these disadvantages.

According to the invention, a portable dynamometer is provided with recording means whereby a continuous record of the tension in running yarns, threads, filaments, or the like is obtained. The record may be made on any suitable surface, for instance, on a band or sheet suitably supported, but preferably, a record sheet is mounted on the periphery of a drum driven in any convenient manner.

In order to render the dynamometer sensitive to large and rapid fluctuations in tension, there may be incorporated into the driving mechanism means to set up vibrations in the instrument. Such means may conveniently comprise an eccentrically loaded part arranged to revolve rapidly, so as to produce the vibrations. By these means, the resistance of the moving parts, and particularly of the recording pen or pencil, is considerably lessened and accurate records are thus obtained.

Conveniently, the record sheet is driven by clockwork, and in order to achieve the above result, an eccentric weight is applied to a rapidly revolving shaft thereof, for instance, a weight is applied to one arm of the air brake or governor.

According to one embodiment of the invention, a portable frame member carries a pair of pulleys mounted on fixed pivots, and also supports a rod or bar movable against the action of a spring and terminating in a third pulley. A stylus on the rod or bar cooperates with a record-drum carried by and rotatably mounted with respect to the frame. The drum is driven by clockwork, which may embody an eccentric weight as described above for the purpose of rendering the instrument sensitive.

We will now describe with the aid of the accompanying drawing one form of dynamometer according to the invention, but it is to be understood that the following description is given by way of example only and is not to be construed as in any way limitative.

In the drawing, which shows the instrument in part-sectional elevation, 1 is an L-shaped frame carrying on its longer (horizontal) limb a housing 2, the ends of which are closed by discs 3, 4, a third disc 5 being arranged at an intermediate position between the ends 3, 4. A rod 6 is slidably mounted in holes in the discs 3, 4, 5 and carries a disc 7, a compression spring 8 being arranged between the discs 5 and 7.

An extension 9 of the frame 1 carries two fixed pulleys 10 and a third pulley 11 is mounted on one end of the rod 6, the three pulleys being arranged to receive a running thread or the like 12, as shown in chain line in the figure. The thread may be readily applied to the pulleys while it is running, and the elongated form of the instrument illustrated enables relatively inaccessible threads to be reached.

The end of the rod 6 remote from the pulley 11 is provided with a stylus 13 co-operating with a record sheet carried by a drum 14. This drum is pivotally mounted on a shaft 15 secured to the frame 1 and a clockwork driving mechanism, designated generally as 16, is contained within the drum. A governor 17 carrying an eccentric weight 18 is driven through a gear train 19. The mechanism 16 is wound up by turning the drum 14 and, on being released, the drum revolves at a speed governed by the governor 17, the weight 18 revolving eccentrically and setting up vibrations in the instrument for the purpose stated.

In operation, the tension of the thread or the like 12 acting on the pulley 11 operates the rod 6, and the stylus 13 carried thereby records the tension on the record sheet carried by the drum 14, the vibrations enabling even the greatest and most rapid fluctuations in tension to be accurately recorded.

What we claim and desire to secure by Letters Patent is:—

A dynamometer for determining the tension at a given time in yarns, threads, filaments and the like running under rapidly fluctuating tension, comprising a portable frame, a spring loaded stylus bar movably mounted on said frame, a pair of fixed pulleys mounted on said frame, a third pulley mounted on said stylus bar, the three pulleys being adapted to engage running yarns, threads, filaments and the like, a clockwork driven drum mounted on said frame, a record sheet mounted on said drum and cooperating with the stylus on said stylus bar to make records of the tension of yarns, threads, filaments and the like engaged by the said pulleys, and an eccentrically loaded governing device associated with said drum and adapted to set up vibrations in the dynamometer so as to decrease the friction between the record sheet and the stylus to ensure that the rapid fluctuations in tension are accurately recorded on the record sheet.

In testimony whereof we have hereunto subscribed our names.

HENRY EWING.
ROBERT PIERCE ROBERTS.